United States Patent
Kawamichi et al.

(10) Patent No.: US 7,181,470 B1
(45) Date of Patent: Feb. 20, 2007

(54) COINCIDENCE METHOD FOR DISTRIBUTION SYSTEM

(75) Inventors: Hiroaki Kawamichi, Yokohama (JP); Shigetoshi Sameshima, Machida (JP); Katsumi Kawano, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 503 days.

(21) Appl. No.: 09/648,733

(22) Filed: Aug. 28, 2000

(30) Foreign Application Priority Data

Nov. 12, 1999 (JP) ................................. 11-322118

(51) Int. Cl.
*G06F 12/00* (2006.01)

(52) U.S. Cl. ...................... 707/201; 709/205; 709/207; 709/204; 718/102

(58) Field of Classification Search ............... 707/8, 707/200–203, 204; 705/1, 20; 709/200–203, 709/204–207; 718/100, 107, 102
See application file for complete search history.

(56) References Cited

U.S. PATENT DOCUMENTS

| | | | | |
|---|---|---|---|---|
| 4,789,986 A | * | 12/1988 | Koizumi et al. ............ 714/797 |
| 5,172,314 A | * | 12/1992 | Poland et al. .................. 705/1 |
| 5,223,991 A | * | 6/1993 | Nagai et al. ................ 360/72.2 |
| 5,640,556 A | * | 6/1997 | Tamura ........................ 707/10 |
| 5,706,509 A | * | 1/1998 | Man-Hak Tso ............. 707/201 |
| 5,794,254 A | * | 8/1998 | McClain ..................... 707/204 |
| 5,796,999 A | * | 8/1998 | Azagury et al. .............. 707/10 |
| 5,835,721 A | * | 11/1998 | Donahue et al. ............ 709/224 |
| 5,907,839 A | * | 5/1999 | Roth ............................. 707/5 |
| 5,995,015 A | * | 11/1999 | DeTemple et al. ..... 340/825.49 |
| 6,240,416 B1 | * | 5/2001 | Immon et al. ................ 707/10 |
| 6,314,408 B1 | * | 11/2001 | Salas et al. ................... 705/54 |
| 6,493,720 B1 | * | 12/2002 | Chu et al. ................ 707/104.1 |

FOREIGN PATENT DOCUMENTS

| | | |
|---|---|---|
| JP | 61-58050 | 3/1986 |
| JP | 10-320256 | 12/1998 |

* cited by examiner

*Primary Examiner*—Lewis A. Bullock, Jr.
(74) *Attorney, Agent, or Firm*—Mattingly, Stanger, Malur & Brundidge, P.C.

(57) ABSTRACT

A distribution system having plural elements including one or more computation devices holds distributed common data without distinction between master data and duplicate data upon entrance or withdrawal of the elements. Coincidence among the common data is obtained by majority rule. In the majority rule, a significance level is defined for each common data, and the significance level is utilized as a weight in majority rule for coincidence among the common data.

13 Claims, 4 Drawing Sheets

| | | |
|---|---|---|
| 11 — ITEM ID | 0123456789 |
| 12 — PRICE | 100 |
| 13 — EFFECTIVE TERM | —/1999-12-30 |
| 14 — STANDARD PRICE | 120 |

| | | |
|---|---|---|
| 21 | ITEM ID | 0123456789 |
| 22 | PRICE | 100 |
| 23 | EFFECTIVE TERM | –/1999-12-30 |

| 31 | STARTING TIME | 1999-12-20 12:00 |
|---|---|---|
| 32 | LAST STARTING TIME | 1999-12-19 11:00 |
| 33 | ESTABLISHING CYCLE | 1:00 |

COINCIDENCE METHOD FOR DISTRIBUTION SYSTEM

BACKGROUND OF THE INVENTION

The present invention relates to a method for coincidence among common data which is distributed and held in a distribution system having one or more elements including a computation device to enter or withdraw into/from the system.

In a distribution system where plural data bases holding master data and its partial sets as duplicate data are distributed, as to duplicate data update, a data update control method and apparatus for distribution data base system disclosed in Japanese Unexamined Patent Publication No. H10-320356 is known.

In this method, the master data base side holding the master data holds an update history file, and upon master data update, the master data base side-updates the update history file. Upon reception of reference request, the update history file of the master data is referred to, and if the file has been updated, the data of the master data base is obtained. By this arrangement, the master data base and the duplicate data base can be independently updated, and time necessary for the master data base update can be reduced.

In the common-data coincidence method in the conventional distribution system as described above in which master data exists, a device which holds the master data and never withdraws from the system must be provided, and such device usually is a redundant element. Otherwise, if the device holding the master data withdraws from the system, the system cannot function.

Further, there is a high probability that the system cannot function due to the above feature when the device holding the master data is broken. To avoid such inconvenience, plural devices must hold the master data. In this case, such devices may be redundant elements.

Further, an abnormality detection device of multiple processing system to detect valid data from the abovementioned multiplexed data performs detection based on the assumption that the number of devices which output valid data is large. Accordingly, in a system controlled by a human manager or the like, a problem occurs when a large number of outputs are not always valid data. Further, in a case where the number of element devices is too large, as coincidence among all the data cannot be obtained without difficulty, problems occur in the above-described method.

SUMMARY OF THE INVENTION

The present invention has been made in consideration of the above situation to provide a method for managing distributed common data to manage data without distinction between master data and duplicate data. It is an object of the present invention to manage the common data distributed and held by devices in the system without redundancy of element by obtaining coincidence among the common data based on the number of devices holding common data of the same value. In the data management, a significance level indicating the validity of data is defined, and data coincidence is obtained by weighting data by using the significance level.

To attain the above object, the present invention provides a distribution system having plural elements including one or more computation devices, in which upon occurrence of entrance or withdrawal of the elements, common data is distributed and held without distinction between master data and duplicate data among these plural common data. Further, in the system, coincidence among these data is obtained based on majority rule. In the majority rule, a significance level is defined for each common data, and the significance level is used as a weight in the majority rule for coincidence among the common data. The majority rule here means a rule to obtain data coincidence in correspondence with the number of devices having the same data value among the element devices. The significance level is defined based on the number of updates. Otherwise, the significance level is defined based on data update event. Otherwise, the significance level is defined based on data update time.

The common data coincidence by majority rule is obtained in accordance with a request from the element. Otherwise, the common data coincidence by majority rule is obtained in accordance with access to any common data. Otherwise, the common data coincidence by majority rule is obtained periodically in accordance with previously established information defined in advance. Otherwise, the common data coincidence by majority rule is obtained at a preprogrammed time based on the previously established information. The established information may be changed by a user during the operation of the distribution system. Further, the coincidence processing is repeated.

As described above, as coincidence can be obtained among common data distributed and held without distinction between master data and duplicate data, redundant element is not necessary even in a system having elements which entry or withdraw into/from the system. Further, the influence of breakage of master-data holding device on peripheral elements as in the conventional system can be reduced. Further, as the significance level defined for each data or device is used as a weight in the majority rule, the validity of data obtained as a result of majority rule can be increased. Further, by repeating the data coincidence processing, more data coincidence can be obtained.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a perspective view showing an example where the present invention is applied to a sales price management system in a retail store or the like;

FIG. 2 illustrates an established information management table held in an IC tag attached to a product;

DETAILED DESCRIPTION OF THE PREFERRED EMBODIMENTS

Preferred embodiments of the present invention will now be described in detail in accordance with the accompanying drawings.

First Embodiment

Figures 1, 2:
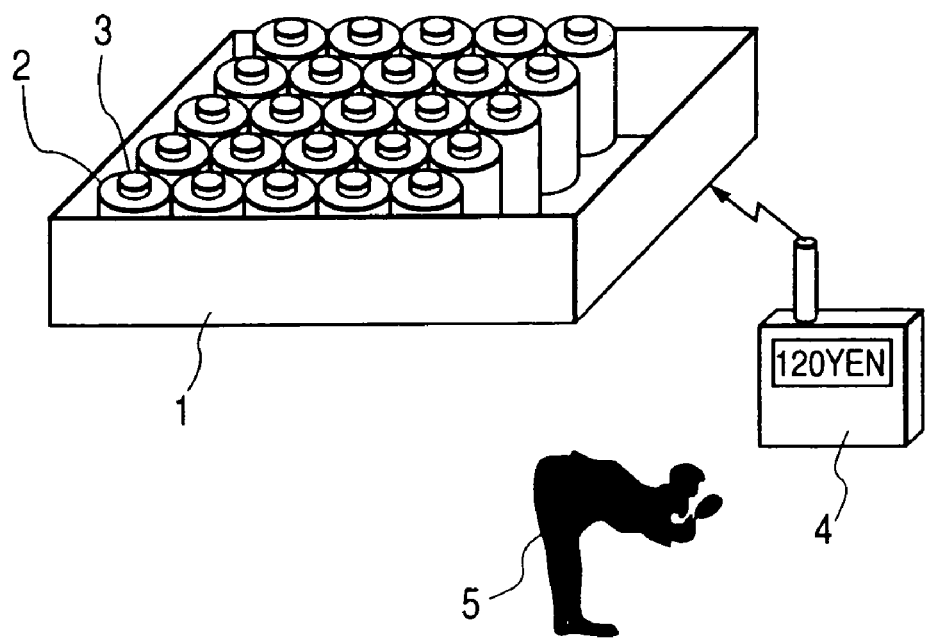

FIG. 1 is a perspective view showing a selling price management system in a retail store or the like, to which the information coincidence method for distribution system of the present invention is applied. Numeral 1 denotes a shelf-type showcase of products in the retail store. The showcase 1 has products 2 on display. The products 2 may be soft drink cans or perishable food products. Further, the products 2 have different selling prices in respective retail stores. Further, IC tags 3 are attached to these products. The IC tag 3 holds information as shown in FIG. 2. In FIG. 2, a product ID 11 is information indicating the type of product to which the tag is attached. A price 12 is information indicating the actual selling price of the product to which the IC tag 3 is attached. In the example of this figure, the price is 100 Yen.

Further, an effective term 13 indicates a term during which the setting of the price 12 is effective and the price 12 is used as an actual selling price. For example, the effective term 13 is utilized when the price is changed only during a predetermined period of a sale or the like. Further, in this example, in the effective term 13, a start date is not set, and an end date is Dec. 30, 1999. In this case, the price 12 is effective from the point where the effective term 13 was set.

Figures 3, 4:
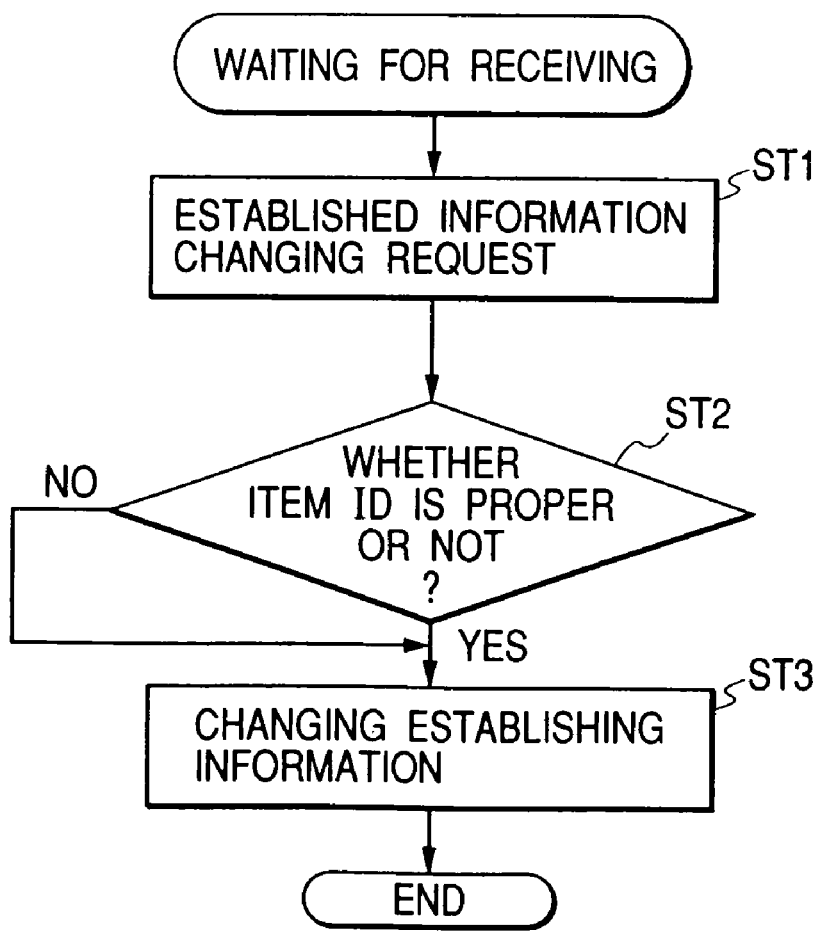
FIG. 3 is a table showing the contents of established information changing request to a product.
FIG. 4 is a flowchart showing processing in IC tag initial setting and setting change.

Further, the effective term 13 can be set as an endless term. Otherwise, the effective term 13 may be set as a time sale period or the like. In such case, it may be arranged such that the time at which a customer has taken the product from the showcase 1 is stored into the IC tag 3, and it is determined whether the price is a time sale price or not. Further, a standard price 14 indicates a normal time selling price after the expiration of the effective term 13. In FIG. 3 reference numeral 4 denotes a device which sets the established information as shown in FIG. 2 of the IC tag 3. An operator 5 who manages selling prices performs selling-price initial setting by the device 4. The setting is limitedly performed to uniformly change the price of related products, upon selling price initial setting, setting change or the like. Upon setting, the device 4 transmits information as shown in FIG. 3 to the IC tag 3 attached to the product 2 by wireless communication.

FIG. 4 shows the flow of processing in the IC tag 3 which received the information from the device 4. At all times, the IC tag 3 waits for reception of established information changing request. First, at step ST1, an established information changing request message is received from the device 4. The received message, as shown in FIG. 3, has an item ID 21 indicating the type of product as a request transmission destination, a price 22 to be set, and an effective term 23 indicating a term during which the price 22 is effective as a selling price of the product 2. Next, the process proceeds to step ST2, at which it is determined whether or not the item ID 21 of the received established information changing request message is valid. For example, it is determined whether or not the item ID 11 held in the IC tag 3 corresponds with the item ID 21 of the received established information changing request message. It is determined as a result of determination at step. ST2 that the item ID is valid, the process proceeds to step ST3, at which the price 12 and the effective term 13 held in the IC tag 3 are replaced with the price 22 and the effective term 23 of the established information changing request. At the completion of the processing, the IC tag again waits for the established information changing request. Further, if it is determined at step ST2 that the item ID is not valid, the process ends, and the IC tag waits for the reception of established information changing request.

Figure 5:
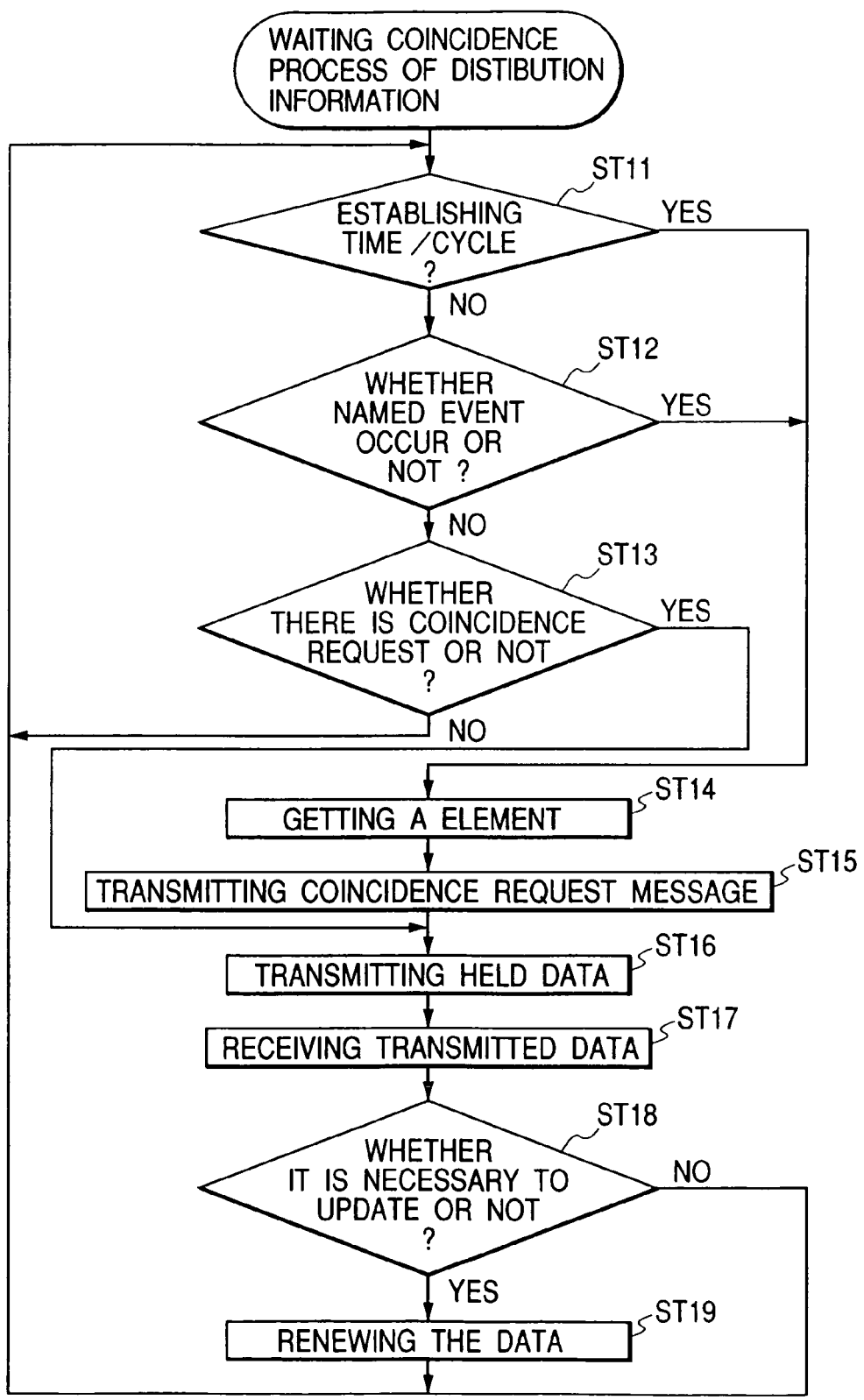
FIG. 5 is a flowchart showing coincidence processing on common data distributed and held in IC tags.
Figures 6, 7:
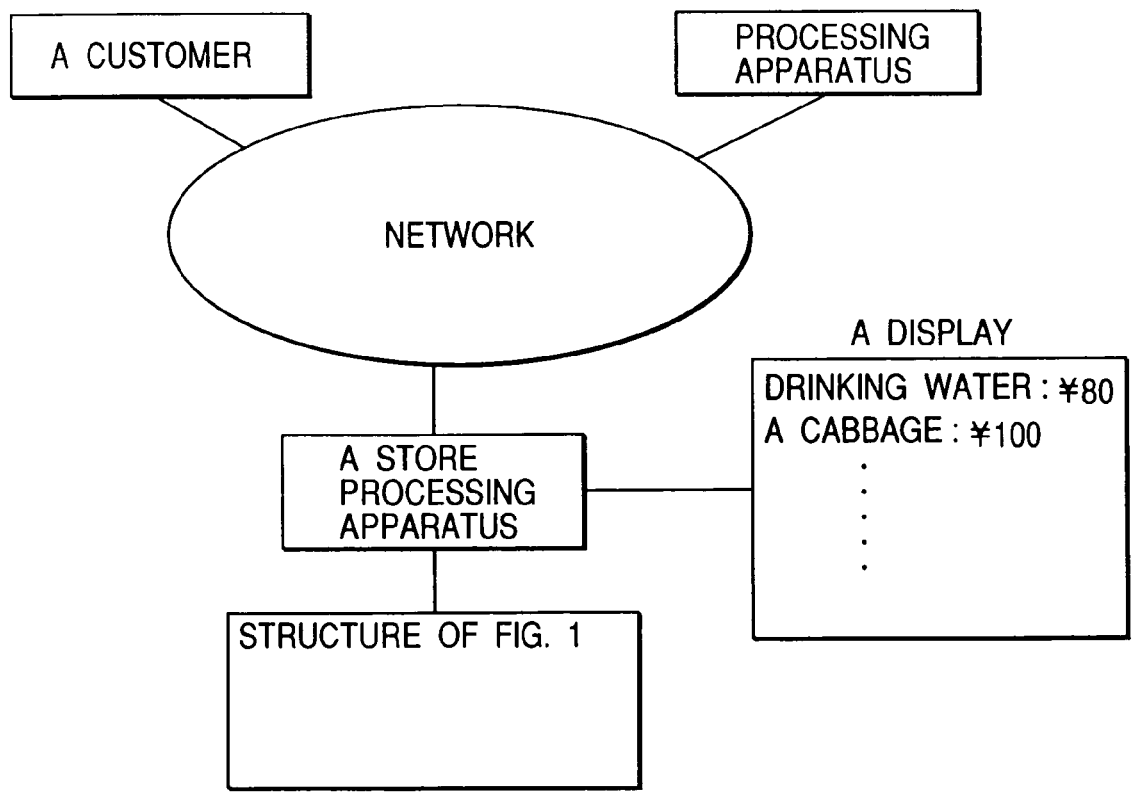
FIG. 6 is a table showing coincidence processing starting condition held in the IC tag.
FIG. 7 is a block diagram showing a system construction for application of the present invention to an advertisement method.

Next, FIG. 5 shows the flow of processing of common data coincidence method in the distribution system of the present invention. First, at step ST11, it is determined whether or not established time has come, otherwise, it is determined whether or not time of established cycle has elapsed since the execution of previous information coincidence processing. It may be arranged such that the IC tag 3 holds information such as starting time 31 and last starting time 32 indicating the time of previous information coincidence processing, and an established cycle 33, used at step ST1, in the form of table as shown in FIG. 6. The starting time 31 may be plural times. Further, the starting time 31 and the established cycle 33 may not be set.

If it is determined at step ST11 that the starting time has not come or time of the established cycle has not elapsed, the process proceeds to step ST12. At step ST12, it is determined whether or not a previously-defined event as a starting trigger of the coincidence processing has occurred. The event is e.g. entry/withdrawal of element or access to the common data. In this embodiment, the event can be purchase of the product 2 by a customer, replenishment of the products 2 which are running short, or checking of the price 12 held in the IC tag 3. If it is determined at step ST12 that the event has not occurred, the process proceeds to step ST13. At step ST13, it is determined whether or not a coincidence request has been received from another element. If it is determined that no coincidence request has been received from another element, after a predetermined waiting period, the process returns to step ST11. If it is determined at step ST11 that the set starting time has come or time of the established cycle has elapsed, the process proceeds to step ST14.

Further, if it is determined at step ST12 that the event has occurred, the process proceeds to step ST14. Further, if it is determined at step ST13 that a coincidence request has been received from another element, the process proceeds to step ST16. At this time, a correction message for an internal clock held in the IC tag 3 is also received, and based on the message, the internal clock of the IC tag 3 is corrected. When the correction message is received, coincidence processing on the common data of the set time and the set cycle by the time indicated by the correction message is cancelled. At step ST14, the elements are acquired. The acquisition of the elements can be made by using a survival signal which each element periodically transmits. The elements in this embodiment are all the products 2 (IC tags 3) in the same showcase 1.

Next, the process proceeds to step ST15, at which a coincide request message is transmitted to these elements. At this time, a correction message to the internal clock of the IC tag 3 of each element is attached to the coincidence request message, then the coincidence message is transmitted. At step ST16, as to the common data to which the coincidence request has been made, the data held in the IC tag 3 is transmitted. The common data here is, e.g., the price 12 and the effective term 13 held in the IC tag 3. Further, at step ST17, the common data transmitted at step ST16 is received. It may be arranged such that the acquisition of the message is made for a predetermined period, and then the process proceeds to step ST18. Otherwise, it may be arranged such that, based on the number of elements obtained at step ST14, the process proceeds to step ST18 if a predetermined numbers of messages are obtained.

At step ST18, it is determined whether or not the common data must be updated. In this determination, only the messages obtained at step ST17 are used. Among the messages obtained at step ST17, the data value owned by the largest number of messages is used as common data value. Regarding respective data, a significance level is set for each device or each data in the IC tag 3, and the significance level is utilized as a weight in the above determination. The determination by significance level is made since the number of common data is unfixed, and determination cannot be performed simply by majority rule when the products have high data reliability though the number of the products is small from the start. Accordingly, in such case, the significance level may be increased in proportion to the number of data updates. Otherwise, the significance level may be increased upon data update by the device 4. Otherwise, the significance level may be increased upon direct data setting by a user. Otherwise, in accordance with data update time, the significance level of late update data may be increased. If it is determined as a result of determination that the common data must be updated, the process proceeds to step ST19, to update the common data.

If all the obtained data do not correspond with each other, it may be determined that the coincidence processing has not been performed on all the data, and coincidence request may be made again. Then, after a predetermined waiting period, the process returns to step ST11. Further, if it is determined at step ST18 that the common data is not to be updated, the process returns to step ST11 after a predetermined waiting period. Thus the coincidence processing enables data input without setting different selling prices for respective retail stores upon arrival of products.

Note that the present invention is also applicable to a product advertisement method by using a system as shown in FIG. 7. When coincidence is obtained among the selling prices, the advertisement information including the coincidence-processed selling price may be transmitted from a store processing apparatus via a network such as the Internet to customer processing apparatuses. Further, the information may be transmitted from the product to the customers without the store processing apparatus. Further, communication with the customers is not limited to the transmission to the customer processing apparatuses but may be made via facsimile or telephone transmission. Further, the advertisement may be displayed on a display device in a store or the like instead of being transmitted to the customers.

Further, electronic commerce may be performed in the system in FIG. 7 using a coincidence-processed price. For this purpose, among product information stored in the store processing apparatus, information indicating the price is corrected to the coincidence-processed price. Then, electronic commerce is performed based on the corrected price.

The present invention is not limited to the above embodiments and various changes and modifications can be made within the spirit and scope of the present invention. Therefore, to appraise the public of the scope of the present invention, the following claims are made.

The invention claimed is:

1. A data coincident method among elements which connect with other elements located in a nearby area, comprising the steps of:
   a first step for determining whether or not a previously defined event as a starting trigger of a coincidence processing has occurred with respect to one of said elements if an established time arrives or a time period of an established cycle has elapsed since the execution of previous information coincidence processing;
   a second step for acquiring a group of said elements corresponding to said one of said elements if said previously defined event has occurred at the first step
   a third step for transmitting a coincidence request by wireless communication to said group of elements if said previously defined event has occurred at the first step;
   a fourth step for one of said elements to transmit a common data by wireless communication in response to said coincidence request at the third step;
   a fifth step for determining whether or not said common data for one of the elements must be updated according to the largest number of the common data and significance level corresponding to a data update obtained from a group of the elements at the fourth step; and
   a sixth step for updating said common data for one of the elements by using the common data held among the largest number of the common data and significance level obtained from the group of the elements at the fourth step, being a majority of said elements, and returning to said first step,
   whereby if all of the data obtained from the group of the elements at the fourth step are not coincident, coincidence processing is repeated until all of the data is coincident.

2. The data coincident method according to claim 1, wherein said majority is determined to be data obtained a largest number of times at the second step.

3. The data coincident method according to claim 1, wherein said previously defined event as a starting trigger of a coincidence processing is at least one of an entry or withdrawal of said one of said elements.

4. The data coincident method according to claim 1, wherein an acquisition of said group of said elements in the second step, is made by using a survival signal which each element periodically transmits through a transmission means attached to each element.

5. The data coincident method according to claim 1, wherein said common data in the fourth step is at least one of an element's price or an element's effective term held in an integrated circuit (IC) tag attached on each element.

6. The data coincident method according to claim 1, further comprising after fourth step:
   a seventh step for said elements to receive said common data;
   wherein only data obtained at the seventh step are used in a determination at fifth step.

7. The data coincident method according to claim 1, wherein said previously defined event as a starting trigger of a coincidence processing is an access to said common data.

8. The data coincident method according to claim 1, wherein each element has an integrated circuit (IC) tag attached and said common data is held by the IC tag of each element.

9. The data coincident method according to claim 1, wherein the significance level is determined corresponding to the number of data updates.

10. The data coincident method according to claim 9, wherein the significance level may be increased upon the number of the data update.

11. The data coincident method according to claim 1, wherein the significance level is determined in accordance with data update time.

12. The data coincident method according to claim 11, wherein the significance level of late update data may be increased.

13. A element composing included in a distribution system of which element may be connected with other elements located in a nearby areas, comprising:

- a first module for determining whether or not a previously defined event as a starting trigger of a coincidence processing has occurred with respect to one of said elements if an established time has arrived or if a time period of an established cycle has elapsed since the execution of previous information coincidence processing;
- a second module for acquiring a group of said elements corresponding to said one of said elements if said previously defined event has occurred at the first module;
- a third module for transmitting a coincidence request by wireless communication to said group of elements if said previously defined event has occurred at the first module;
- a fourth module for one of said elements to transmit a common data by wireless communication in response to said coincidence request at the third module;
- a fifth module for determining whether or not said common data for one of the elements must be updated according to the largest number of the common data and significance level corresponding to a data update obtained from a group of the elements at the fourth module; and
- a sixth module for updating said common data for one of the elements by using the common data held among the largest number of the common data and significance level obtained from the group of the elements at the fourth module elements,
- a seventh module for repeating the coincidence processing until all of the data is coincident if all of the common data obtained from the group of the elements at the fourth module are not coincident.

* * * * *